United States Patent
Bund et al.

(10) Patent No.: US 10,181,874 B2
(45) Date of Patent: Jan. 15, 2019

(54) SYSTEM FOR TRANSMITTING POWER AND DATA

(71) Applicant: SEW-EURODRIVE GMBH & CO. KG, Bruchsal (DE)

(72) Inventors: Martin Bund, Karlsruhe (DE); Claus Schoepfer, Wiesloch (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 184 days.

(21) Appl. No.: 15/103,088

(22) PCT Filed: Dec. 5, 2014

(86) PCT No.: PCT/EP2014/003261
§ 371 (c)(1),
(2) Date: Jun. 9, 2016

(87) PCT Pub. No.: WO2015/086137
PCT Pub. Date: Jun. 18, 2015

(65) Prior Publication Data
US 2016/0308582 A1   Oct. 20, 2016

(30) Foreign Application Priority Data

Dec. 10, 2013  (DE) .......................... 10 2013 020 381
May 15, 2014  (DE) .......................... 10 2014 007 064

(51) Int. Cl.
*H04B 3/54*     (2006.01)
*B60R 16/02*    (2006.01)
(Continued)

(52) U.S. Cl.
CPC ............. *H04B 3/542* (2013.01); *B60R 16/02* (2013.01); *H02H 3/253* (2013.01); *H04B 3/46* (2013.01);
(Continued)

(58) Field of Classification Search
CPC . H04B 3/46; H04B 3/54; H04B 3/542; H04B 2203/5408; H04B 2203/5466;
(Continued)

(56) References Cited

U.S. PATENT DOCUMENTS 4,912,390 A    3/1990 Curran, Jr. et al.
4,990,908 A    2/1991 Tung
(Continued)

FOREIGN PATENT DOCUMENTS

CA    1143811    3/1983
DE    150 824    9/1981
(Continued)

OTHER PUBLICATIONS

International Search Report, dated Mar. 5, 2015, issued in corresponding International Application No. PCT/EP2014/003261.
(Continued)

*Primary Examiner* — Hal Kaplan
(74) *Attorney, Agent, or Firm* — Hunton Andrews Kurth LLP

(57) ABSTRACT

A system for transmitting power and data, particularly including a half-wave control, includes a control unit connected to grid phases, the system having a phase-failure detection device which has bistable multivibrators, especially bistable multivibrators assigned to a respective grid phase. Each bistable multivibrator has an input for setting and an input for resetting, one of the inputs being connected to a digitizing device for digitizing the positive half-waves of a respective grid phase, the other of the inputs being connected to a digitizing device for digitizing the negative half-waves of a respective grid phase. The effective value of the output voltage of the bistable multivibrator is compared by a comparison device to a threshold value to detect a phase failure.

15 Claims, 4 Drawing Sheets

(51) Int. Cl.
*H02H 3/253* (2006.01)
*H04B 3/46* (2015.01)
*H02J 13/00* (2006.01)
*H02H 3/05* (2006.01)
*H02J 3/18* (2006.01)

(52) U.S. Cl.
CPC .............. *H04B 3/54* (2013.01); *H02H 3/05* (2013.01); *H02J 3/1892* (2013.01); *H02J 13/0051* (2013.01); *H04B 2203/5408* (2013.01); *H04B 2203/5466* (2013.01); *Y02E 60/783* (2013.01); *Y02E 60/7892* (2013.01); *Y04S 40/123* (2013.01); *Y04S 40/146* (2013.01)

(58) Field of Classification Search
CPC .......... B60R 16/02; H02H 3/253; H02H 3/05; H02J 3/1892; H02J 13/0051; Y02E 60/783; Y02E 60/7892; Y04S 40/123; Y04S 40/146
USPC .................................................. 307/9.1, 10.1
See application file for complete search history.

(56) References Cited

U.S. PATENT DOCUMENTS

| | | |
|---|---|---|
| 5,055,746 A | 10/1991 | Hu et al. |
| 6,097,761 A | 8/2000 | Buhring et al. |
| 7,919,994 B2 | 4/2011 | Walker et al. |
| 8,724,276 B2 | 5/2014 | Igl et al. |

FOREIGN PATENT DOCUMENTS

| | | |
|---|---|---|
| DE | 10 2008 044 147 | 4/2010 |
| DE | 10 2009 022 832 | 4/2010 |
| DE | 10 2011 005 563 | 9/2012 |
| DE | 10 2012 019 205 | 6/2014 |
| EP | 1 289 217 | 3/2003 |
| JP | S63 59121 | 3/1988 |
| JP | 2001 160769 | 6/2001 |

OTHER PUBLICATIONS

International Preliminary Report on Patentability and Written Opinion issued in PCT/EP2014/003261, dated Jun. 14, 2016.

SYSTEM FOR TRANSMITTING POWER AND DATA

FIELD OF THE INVENTION

The present invention relates to a system for transmitting power and data.

BACKGROUND INFORMATION

It is generally known that in a rail system for transmitting power and data, a receiver is able to be supplied with power.

SUMMARY

Therefore, in a system for transmitting power and data, example embodiments of the present invention provide for a grid phase failure detection in a simple manner, in particular, the power being supplied with the aid of a three-phase voltage system, e.g., especially a sinusoidal three-phase voltage system, and the intention being for the information transmitted to the receiver to be digitally detectable.

Among features of example embodiments of the present invention with regard to the system are that it is provided for transmitting power and data, particularly including a half-wave control, having a control unit connected to grid phases.

The system includes a phase-failure detection device which has bistable multivibrators, especially bistable multivibrators assigned to a respective grid phase, each bistable multivibrator having an input for setting and an input for resetting, one of the inputs being connected to a digitizing device for digitizing the positive half-waves of a respective grid phase.

The other of the inputs is connected to a digitizing device for digitizing the negative half-waves of a respective grid phase, the effective value of the output voltage of the bistable multivibrator being compared by a comparison device to a threshold value to detect a phase failure, especially by rectifying and smoothing the output signal, so that a comparison device monitors the smoothed value for exceeding or dropping below a threshold value.

The output signals of the comparison device are supplied to an OR-operation device to form an output signal of the phase-detection device.

An advantage in this context is that the failure of the grid phase is quickly detectable and it is possible to use only cost-effective, less complex flip-flops. In this case, each grid phase is supplied to one path in which the positive half-waves are digitized, and to another path in which the negative half-waves are digitized. The digitized pulses assigned to the respective half-wave are then usable as set signal or reset signal for a flip-flop. Thus, a failure is able to be detected in a very simple manner. As soon as the output signal no longer changes fast enough, its effective voltage drops and thus a failure is easily detectable.

A voltage corresponding to the grid phase voltage, especially a voltage produced by a voltage divider (R1, R2) made up of resistors, may be supplied to a diode (D1), whose output signal
- is utilized as control voltage for a voltage-dependent switch (Th)
and
- is used for charging a capacitor (C3), especially a condenser (C3), in particular, the charging current being conducted across a diode (D2).

An advantage in this case is that after the peak value of the voltage of the respective half-wave of a grid phase has been exceeded, the optocoupler generates a pulse-shaped signal whose pulse duration is determined by the capacitance value of capacitor C3. Thus, digitizing of the sinusoidal characteristic is permitted in an easy manner.

A transmitter may connect a line, especially a command phase, selectively to one of a plurality, particularly three, grid phases, a receiver being electrically connected to the grid phases and to the line, particularly via sliding contacts.

The receiver includes a control unit and a load, especially an electric motor driving a mobile part, which is able to be supplied from the grid phases, the control unit having a digitizing device, each digitizing device being connected to one of the grid phases, and in the digitizing device a voltage corresponding to the grid phase voltage, especially a voltage produced by a voltage divider (R1, R2) made up of resistors, is fed to a diode (D1), whose output signal
- is utilized as control voltage for a voltage-dependent switch (Th)
and
- is used for charging a capacitor (C3), especially a condenser (C3), in particular, the charging current being conducted across a diode (D2).

An advantage in this case is that after the peak value of the voltage of the respective half-wave of a grid phase has been exceeded, the optocoupler generates a pulse-shaped signal whose pulse duration is determined by the capacitance value of capacitor C3. Consequently, digitizing of the sinusoidal characteristic of the power transmitted with the aid of a collector wire to a rail vehicle is permitted in an easy manner.

The output signal may feed a resistor (R3), which is connected with one of its two terminals to a reference potential, and with the other of its terminals to diode (D1). An advantage is that the output signal follows the form of the half-wave. In particular, resistor R3 pulls the output signal toward the reference potential, so to speak, e.g., toward zero.

A voltage-dependent switch (Th) may enable and/or open a current path when the voltage present at the control input drops below the voltage applied to capacitor (C3), the current path feeding the input of an optocoupler (V1), particularly the illuminant of an optocoupler (V1). An advantage is that only a limited energy reserve is made available by the capacitor, and therefore only a short-duration pulse is able to be generated. In this manner, a single short pulse is assigned to each positive half-wave, or alternatively and in the case of suitable polarity of diode D1, to each negative half-wave.

The system may be arranged a rail system, especially an overhead monorail system, and the receiver may be disposed on a mobile part, especially a rail vehicle. This offers the advantage of permitting a half-wave control, in which information is transmittable from a stationary transmitter to the receiver located on the mobile part.

The output signal—galvanically isolated from the input—of optocoupler (V1) is supplied to a device for detecting the half-waves, especially a half-wave decoder, the detection device including a comparison device for comparing the output signals of the optocouplers of the digitizing device, in particular, the output signal assigned to the line being compared to the output signals assigned to the grid phases. An advantage is that the pulse generated by the optocoupler is galvanically decoupled and may be further digitally processed.

Each digitizing unit may be connected to one of the grid phases or to the line, especially command phase, and includes
- a digitizing device assigned to the digitizing of the positive half-waves
as well as
- a digitizing device assigned to the digitizing of the negative half-waves.

This is considered advantageous because in each case, one optocoupler is provided for the positive half-waves and one optocoupler is provided for the negative half-waves.

The signal digitizing the positive half-waves of a respective grid phase, e.g., especially the output signal—galvanically isolated from the input—of optocoupler (V1) of the digitizing unit assigned to a respective grid phase, may be supplied to the input for setting a bistable multivibrator and the signal digitizing the negative half-waves of a respective grid phase, e.g., especially the output signal—galvanically isolated from the input—of optocoupler (V1) of the digitizing unit assigned to a respective grid phase, may be supplied to the input for resetting a bistable multivibrator, the effective value of the output signal of the bistable multivibrator being monitored for exceeding or dropping below a threshold value, particularly by rectifying and smoothing the output signal, so that a comparison device monitors the smoothed value for exceeding or dropping below a threshold value. This is considered advantageous because it permits easy phase-failure detection. In particular, a flip-flop is usable for this purpose.

The output signals of the comparison device are OR-ed, so that the output signal of this OR operation assumes a first state, especially HIGH, in response to a grid phase failure, and otherwise assumes a different state, especially LOW. An advantage is that the OR operation is easily implemented, particularly in analog manner, with the aid of diodes.

One terminal each of the voltage divider, resistor (R3), capacitor (C3), the current path and/or the optocoupler of each digitizing device are electrically interconnected, especially so that a reference potential is formed. An advantage is that in this manner, a star point is able to be formed without having to provide a conventional star point having capacitors or resistors in a star connection between the grid phases.

Further features and aspects of example embodiments of the present invention are explained in greater detail below with reference to the appended Figures.

DETAILED DESCRIPTION

As illustrated in the Figures, the control unit permits an evaluation of the phase voltages, particularly a comparison of the command phase to a respective grid phase. In addition, detection of a phase failure is also achievable.

The grid phases are fed from a three-phase voltage system, and in the ideal case, carry sinusoidal phase voltages shifted relative to each other by 120° and 240°, respectively.

Data are transmittable with the aid of the command phase. In this context, a transmitter applies a positive or negative half-wave of one of grid phases (L1, L2, L3) to the command phase. Information is therefore transmittable by applying a respective one of the half-waves of a particular grid phase (L1, L2, L3) to line C1, e.g., command phase C1.

The information is decoded in the control unit by detecting the grid phase (L1, L2, L3) applied to command phase C1 at the specific instant.

Preferably, the control unit is disposed on a mobile unit, which is powered with the aid of a collector wire. Grid phases (L1, L2, L3) and the command phase are thus transmitted to the mobile part with the assistance of a sliding contact.

The respective half-waves are converted to digital signals by applicable digitizing unit 5, e.g., each positive half-wave reaching the input of the control unit assigned a digital signal pulse at the output of a respective first digitizing device, or each negative half-wave reaching the input of the control unit assigned a digital signal pulse at the output of a further respective digitizing device.

Figure 2:
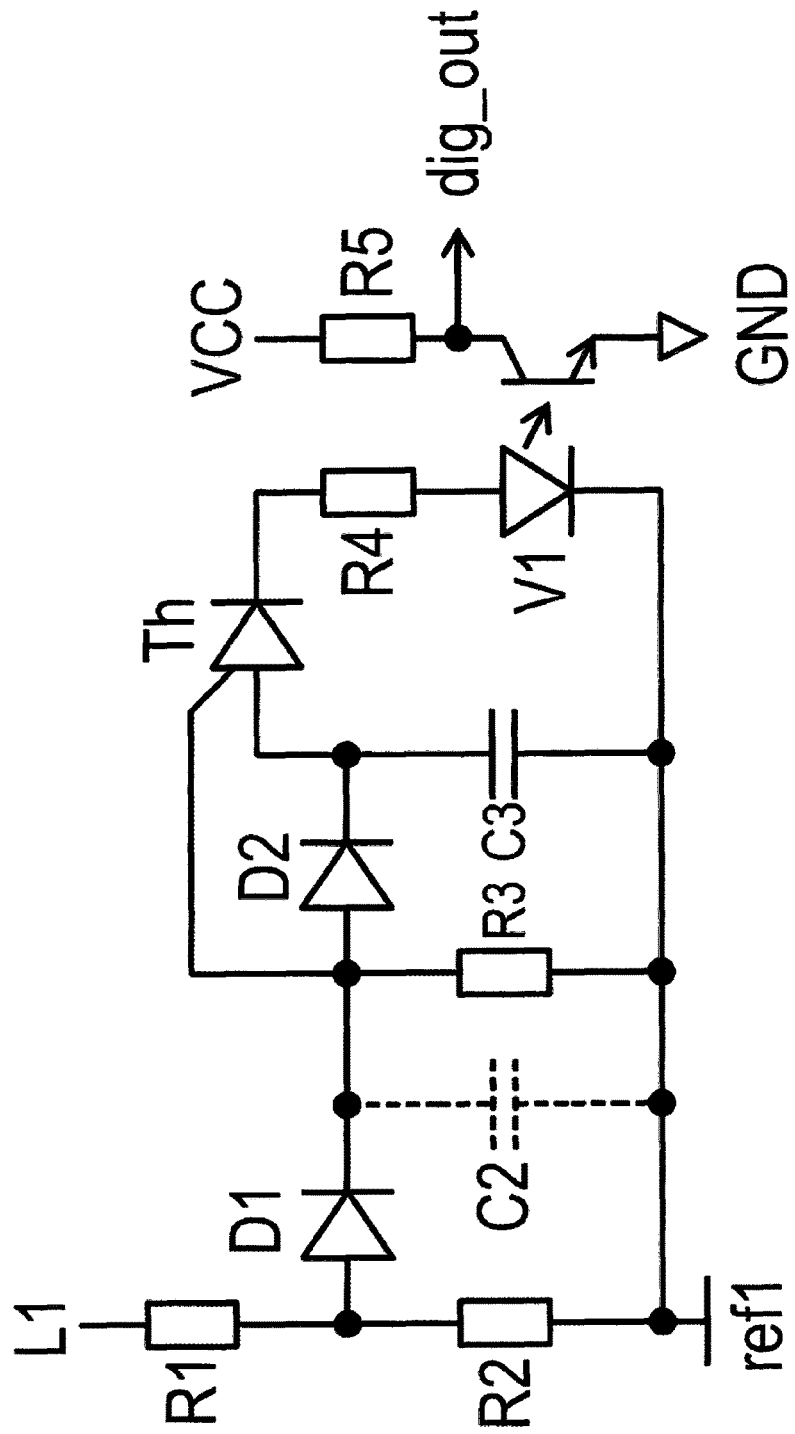
FIG. 2 shows a digitizing device, assigned to the positive half-waves, of one of digitizing units 5 in greater detail, the digitizing device generating a digital voltage pulse from each positive half-wave of the respective grid phase voltage.
Figure 3:
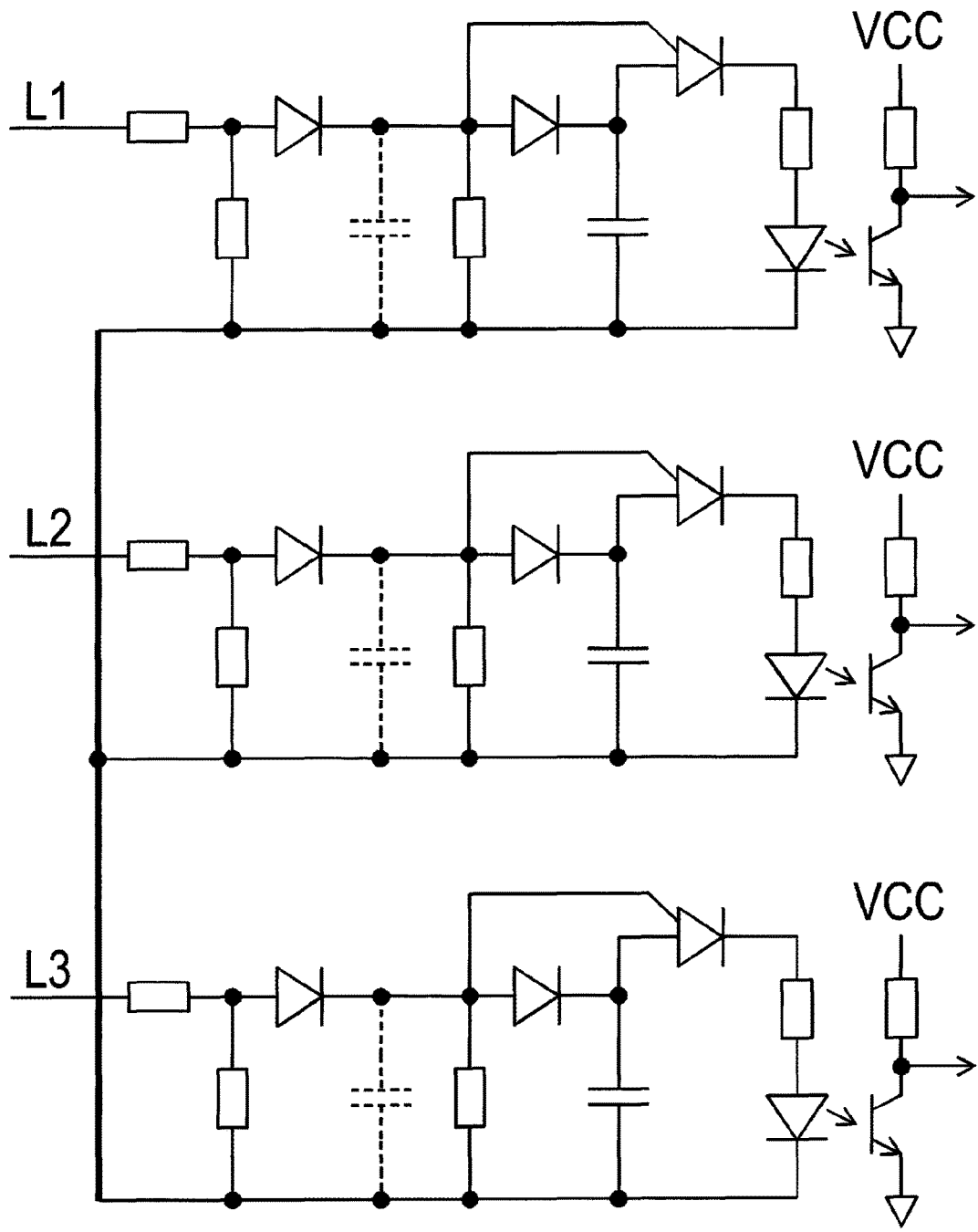
FIG. 3 shows more precisely the interconnection of the digitizing device, assigned in each case to the positive half-waves, of the digitizing units.
Figure 4:
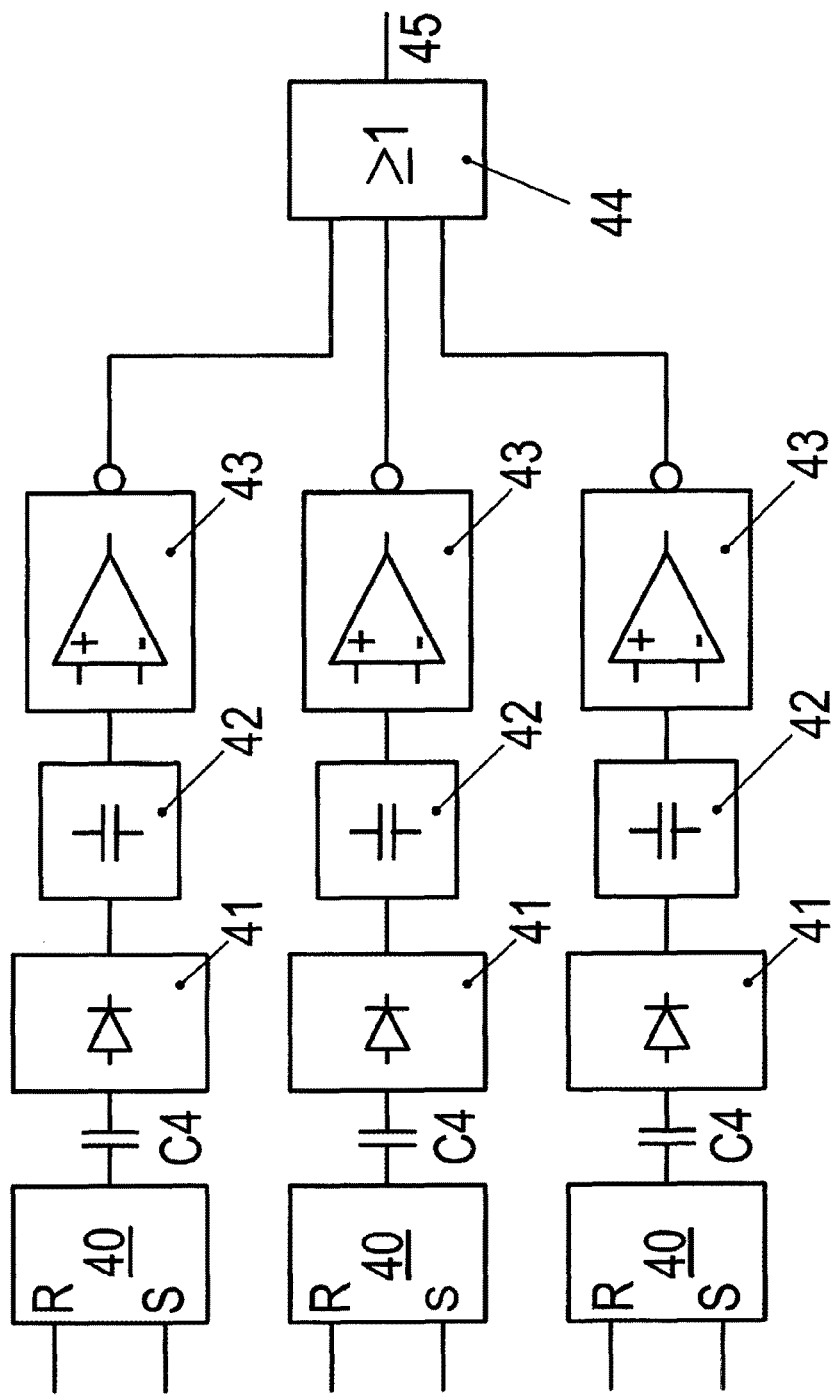
FIG. 4 shows phase-failure detection device 3 in greater detail.

As shown in FIG. 2 in connection with digitizing device of digitizing unit 5 digitizing the positive half-waves, the specific grid phase voltage (FIG. 2: grid phase L1) applied at the input of digitizing unit 5 is reduced by the voltage divider, which is formed of the series connection of resistors R1 and R2, and this reduced voltage is conducted through diode D1, so that only the positive half-waves are transmitted. Optionally, a capacitor C2 may be provided for smoothing. The output voltage of diode D1 feeds a resistor R3, whose other terminal is at a reference potential ref1. Thus, at resistor R3, a voltage is present which is proportional, and in the case of the presence of capacitor C2, is substantially proportional to the half-wave-like characteristic of grid phase (L1) applied at the input of digitizing device 5. From this, a capacitor C3 is able to be fed via a diode D2.

A voltage-dependent switch Th, especially a thyristor, is powered from the voltage present at capacitor C3. The voltage applied at resistor R3 is used as control voltage applied at the control input of switch Th.

If the half-wave exceeds its peak and therefore the voltage at resistor R3 falls, initially the voltage at capacitor C3 remains constant. As soon as switch Th switches, however, capacitor C3 will discharge across an optocoupler V1 disposed at the output of switch Th, and a dropping resistor R4 for limiting current. The discharge takes place in a time span which is shorter than the duration of the half-wave, e.g., half the period duration of the AC voltage supply.

Resistors R2, R3 and capacitor C3 as well as the light-emitting diode of optocoupler V1 are each connected to reference potential ref1 with one of their terminals.

With the aid of optocoupler V1, an output signal dig_out of the digitizing device is thus able to be generated at the galvanically isolated output.

Therefore, for each positive half-wave, a short pulse is thus generated as output signal after the peak of the half-wave has been exceeded.

Figure 1:
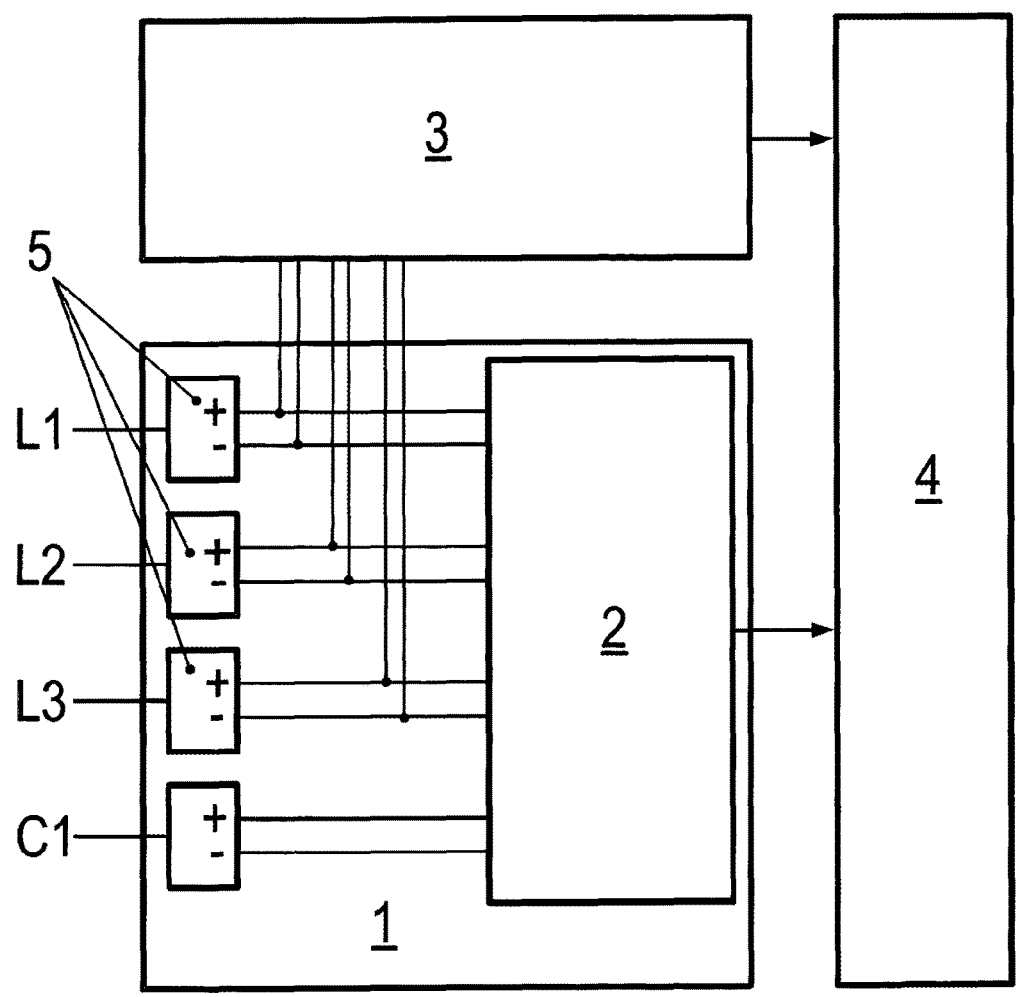
FIG. 1 is a schematic block diagram of the control unit, digitizing units 5 and a phase-failure detection device 3 that monitors the output signals of digitizing units 5.

As shown in FIG. 1, grid phase L1 is thus supplied to digitizing unit 5, which has a first digitizing device according to FIG. 2 for digitizing the positive half-waves, and a corresponding digitizing device for negative half-waves, that differs basically due to a diode D1 disposed with reversed polarity.

Consequently, signal output dig_out belonging to the positive half-waves and the corresponding signal output belonging to the negative half-waves are able to be passed on to half-wave decoder 2. In the same manner, the corresponding output signals of digitizing units 5 belonging to the other grid phases (L2, L3) and to command phase C1 are conducted to half-wave decoder 2.

In the half-wave decoder, command phase C1 is thus able to be compared to grid phases (L1, L2, L3), and the transmitted information is thereby able to be decoded and supplied to control 4.

The failure of a grid phase is detectable with the aid of phase-failure detection device 3. If at least one of the grid phases fails, a corresponding warning signal for this is transmitted to control 4. Thus, the warning signal is able to be taken into account in the evaluation.

The transmission of information is therefore able to be made more reliable.

Phase-failure detection device 3 has three bistable multivibrators 40, preferably in the form of flip-flops, especially RS or JK flip-flops. Each bistable multivibrator 40 has an input S, e.g., an input for setting, and an input R, e.g., an input for resetting.

The specific input for setting is connected to the applicable output dig_out of the digitizing device, assigned to the positive half-waves, of respective digitizing unit 5.

The specific input for resetting is connected to the applicable output of the digitizing device, assigned to the negative half-waves, of respective digitizing unit 5.

Consequently, the output of first bistable multivibrator 40 assigned to grid phase L1 is set by the arrival of the positive half-wave of grid phase L1, and reset by the subsequent arrival of the negative half-wave.

The output signal of respective bistable multivibrator 40 is routed across a capacitor C4, and thus DC voltage components suppressed. The output signal filtered in this manner is rectified by a rectifying device 41 and smoothed by a smoothing device 42, especially a capacitor, so that substantially a DC voltage is produced.

The voltage value smoothed by smoothing device 42 is compared to a critical voltage value by a comparison device 43. The critical voltage value is selected such that if exceeded, no failure of the grid phase exists, and if not attained, a failure of the grid phase is present.

The output signals of the comparison device assigned to grid phases (L1, L2, L3) are supplied to a logic-operation device 44, especially a summation device, which combines the three signals such that in response to a failure of one or more of grid phases (L1, L2, L3), a corresponding output signal 45 is generated. Thus, the grid phase failure is easily detectable and able to be indicated in a single output signal.

If one of grid phases (L1, L2, L3) fails, associated bistable multivibrator 40 no longer changes its output state. Consequently, the voltage at the output of smoothing device 42 drops, and comparison device 43 generates a HIGH level as output voltage instead of the LOW level generated in response to the presence of the grid phase.

The reference potentials of all digitizing devices of all digitizing units 5 are electrically connected and therefore form a star point, e.g., a reference potential. An additional star point formed by resistors and/or other components between the grid phases is therefore not necessary.

In a further exemplary embodiment, the warning signal is even transmitted to half-wave decoder 2 and taken into account there when decoding the information.

LIST OF REFERENCE CHARACTERS

1 Half-wave evaluation device
2 Half-wave decoder
3 Phase-failure detection device
4 Control
5 Digitizing unit
40 Bistable multivibrator, particularly flip-flop, especially RS or JK flip-flop
41 Rectifying device
42 Smoothing device
43 Comparison device
44 Logic-operation device, especially a summation device
45 Output signal
L1 First grid phase
L2 Second grid phase
L3 Third grid phase
C1 Command phase
VCC Supply voltage
GND Ground
Ref1 Reference potential
Dig_out Output signal of digitizing unit 5
Th Voltage-dependent switching element, especially thyristor
C2 Capacitor
C3 Capacitor
C4 Capacitor
D1 Diode
D2 Diode
R1 Resistor
R2 Resistor
R3 Resistor
R4 Resistor
R5 Resistor
V1 Optocoupler

What is claimed is:

1. A system for transmitting power and data, comprising:
a control unit connectable to grid phases;
a phase-failure detector including bistable multivibrators, each bistable multivibrator having an input for setting and an input for resetting, a first one of the inputs connected to a digitizing device adapted to digitize positive half-waves of a respective grid phase, a second one of the inputs connected to a digitizing device adapted to digitize negative half-waves of a respective grid phase, and
at least one comparison device, each comparison device adapted to compare an effective value of an output voltage of a respective bistable multivibrator to a threshold value to detect a phase failure, by rectifying and smoothing an output signal, so that each comparison device monitors a smoothed value for exceeding or dropping below the threshold value.

2. The system according to claim 1, wherein the bistable multivibrators are assigned to respective grid phases.

3. The system according to claim 1, wherein output signals of the at least one comparison device are OR-ed to form an output signal of the phase-failure detector device.

4. The system according to claim 1, wherein a signal representing the positive half-waves of a respective grid phase and/or an output signal, galvanically isolated from the input, of an optocoupler of the digitizing device assigned to a respective grid phase, is supplied to the input for setting a respective bistable multivibrator, and a signal representing the negative half-waves of a respective grid phase and/or an output signal, galvanically isolated from the input, of a optocoupler of the digitizing device assigned to a respective grid phase, is supplied to the input for resetting a respective bistable multivibrator, the effective value of the output signal of the bistable multivibrator being monitored for exceeding or dropping below a threshold value, by rectifying and smoothing the output signal, so that the comparison device monitors the smoothed value for exceeding or dropping below the threshold value.

5. The system according to claim 1, wherein an OR operation is performed on output signals of the comparison device, so that an output signal of the OR operation assumes a first state in response to a grid phase failure, and otherwise assumes a different state.

6. The system according to claim 1, wherein an OR operation is performed on output signals of the comparison device, so that an output signal of the OR operation assumes a HIGH state in response to a grid phase failure, and otherwise assumes a LOW state.

7. A system for transmitting power and data, comprising:
a control unit connectable to grid phases, the control unit adapted to supply to a first diode a voltage corresponding to a grid phase voltage and/or a voltage produced by a voltage divider that includes resistors, the first diode adapted to produce an output signal utilized as a control voltage for a voltage-dependent switch and used to charge a capacitor, a charging current being conducted across a second diode.

8. The system according to claim 7, further comprising:
a transmitter that connects a line and/or a command phase selectively to one of a plurality of grid phases and/or three grid phases,
a receiver electrically connected to the grid phases and to the line via sliding contacts, the receiver having a control unit and a load and/or an electric motor adapted to drive a mobile part that is suppliable from the grid phases;
wherein the control unit includes digitizing devices connected to respective grid phases.

9. The system according to claim 8, wherein the output signal is fed to a resistor, a first terminal of the resistor being connected to a reference potential, a second terminal of the resistor being connected to the first diode.

10. The system according to claim 8, wherein the voltage-dependent switch is adapted to enable or open a current path when a voltage present at the control input drops below a voltage applied to the capacitor, the current path feeding the input of an optocoupler and/or an illuminant of an optocoupler.

11. The system according to claim 10, wherein the output signal, galvanically isolated from the input, of the optocoupler is supplied to a detection device adapted to detect half-waves, the detection device including a comparison device adapted to compare the output signals of optocouplers of the digitizing device and/or to compare the output signal assigned to the line to the output signals assigned to the grid phases.

12. The system according to claim 10, wherein one terminal each of a voltage divider, a resistor, a capacitor, the current path and/or the optocoupler of each digitizing device are electrically interconnected to form a reference potential.

13. The system according to claim 10, wherein the output signal, galvanically isolated from the input, of the optocoupler is supplied to a half-wave decoder.

14. The system according to claim 8, wherein each digitizing device is connected to one of the grid phases or to the line and/or the command phase, and includes a digitizing device adapted to digitize positive half-waves and a digitizing device adapted to digitize negative half-waves.

15. The system according to claim 7, wherein the system is arranged as a rail system and/or an overhead monorail system, and the receiver is arranged on a mobile part and/or a rail vehicle.

* * * * *